United States Patent
Zadeh (10) Patent No.: US 8,228,010 B2
(45) Date of Patent: Jul. 24, 2012

(54) ROTATING TRANSFORMER FOR SUPPLYING THE FIELD WINDING IN A DYNAMOELECTRIC MACHINE

(75) Inventor: Hossein Safari Zadeh, Othmarsingen (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 13/229,793

(22) Filed: Sep. 12, 2011

(65) Prior Publication Data

US 2012/0038308 A1 Feb. 16, 2012

Related U.S. Application Data

(63) Continuation of application No. PCT/EP2010/052940, filed on Mar. 9, 2010.

(30) Foreign Application Priority Data

Mar. 11, 2009 (CH) ........................................ 0364/09

(51) Int. Cl.
*H02P 1/00* (2006.01)
*H02P 3/00* (2006.01)

(52) U.S. Cl. ........ 318/115; 318/119; 318/716; 318/777; 378/15; 378/101; 378/107; 336/84 C; 336/120

(58) Field of Classification Search .................. 318/716, 318/115, 119, 777; 378/15, 101, 107; 336/84 C, 336/120

See application file for complete search history.

(56) References Cited

U.S. PATENT DOCUMENTS

| 3,758,845 | A | | 9/1973 | MacKelvie et al. | |
|---|---|---|---|---|---|
| 4,912,735 | A | * | 3/1990 | Beer | ................ 378/15 |
| 6,483,218 | B1 | | 11/2002 | Petrinko | |
| 6,674,836 | B2 | * | 1/2004 | Harada et al. | ................. 378/107 |
| 7,197,113 | B1 | * | 3/2007 | Katcha et al. | ................. 378/101 |
| 7,508,107 | B2 | | 3/2009 | Lacaze | |
| 7,868,723 | B2 | * | 1/2011 | Dobbs | ........................ 336/84 C |
| 2006/0022785 | A1 | * | 2/2006 | Dobbs | ........................... 336/120 |
| 2011/0075796 | A1 | * | 3/2011 | Loef et al. | ........................ 378/15 |
| 2011/0075797 | A1 | * | 3/2011 | Loef et al. | ........................ 378/15 |

FOREIGN PATENT DOCUMENTS

DE 102004028595 A1 12/2005

(Continued)

OTHER PUBLICATIONS

R. Mecke and C. Rathge, High frequency resonant inverter for contactless energy transmission over large air gap, IEEE 35th Annual Power Electronics Specialists Conference (PESC), 2004, vol. 3, pp. 1737-1743.
European Patent Office, International Search Report in International Patent Application No. PCT/EP2010/052940 (Jul. 29, 2010).
European Patent Office, First Examination Report in Swiss Patent Application No. 3642009 (Jul. 13, 2009).

*Primary Examiner* — Paul Ip
(74) *Attorney, Agent, or Firm* — Leydig, Voit & Mayer, Ltd.

(57) ABSTRACT

An apparatus for transmission of electrical power includes an AC voltage source configured to produce AC voltage. A stator includes a primary winding arrangement electrically fed from the AC voltage source, the primary winding arrangement having at least two primary windings. A rotor includes a secondary winding arrangement inductively coupled to the primary winding arrangement of the stator, the rotor being rotatable in a rotation direction about a rotation axis. The rotation axis does not pass through the at least two primary windings, and the at least two primary windings each extend over a predetermined sector with respect to the rotation direction and are disposed offset with respect to one another within the rotation direction.

15 Claims, 5 Drawing Sheets

FOREIGN PATENT DOCUMENTS

| | | | |
|---|---|---|---|
| DE | 102006057150 A1 | 7/2007 |
| EP | 0749190 A2 | 12/1996 |
| EP | 1708342 A2 | 10/2006 |
| WO | WO 9526069 A1 | 9/1995 |
| WO | WO 0213361 A1 | 2/2002 |

* cited by examiner

ROTATING TRANSFORMER FOR SUPPLYING THE FIELD WINDING IN A DYNAMOELECTRIC MACHINE

CROSS REFERENCE TO PRIOR APPLICATIONS

This application is a continuation of International Patent Application No. PCT/EP2010/052940, filed on Mar. 9, 2010, which claims priority to Swiss Application No. CH 00364/09, filed on Mar. 11, 2009. The entire disclosure of both applications is incorporated by reference herein.

FIELD

The present invention relates to an apparatus for transmission of electrical power from a stator to a rotor. An apparatus such as this is also referred to as a rotating transformer. The invention also relates to a dynamoelectrical machine which is equipped with a rotating transformer.

BACKGROUND

Electrical generators which are in the form of synchronous machines have one or more field windings on the rotor. A field winding is a conductor arrangement which produces a constant magnetic field during operation, which constant field rotates with the rotor, in order to induce an AC voltage in the windings of the stator. Brushes and sliprings may be provided in order to supply current to the rotating field winding. However, these are susceptible to wear. A so-called brushless exciter is therefore often provided, in which there is an auxiliary generator, which is in the form of an external-pole generator and supplies current to the field winding of the actual generator. In this auxiliary generator, a rotor winding which is fitted to the rotor rotates in a static magnetic field produced in the stator. The voltage which is produced in the rotor winding of the auxiliary generator is available, after appropriate rectification, for supplying the field winding of the actual generator. However, an auxiliary generator such as this requires a relatively large amount of space.

WO 95/26069 describes a rotating transformer for transmitting electrical power from the stator to the rotor, instead of an auxiliary generator. The rotating transformer described there comprises two coils which are wound concentrically around the rotation axis and are axially opposite each other along the rotation axis. This design allows the rotating transformer to be arranged only at the end of the rotor shaft, in practice, and this considerably restricts the design freedom, as a result of which this solution is particularly unsuitable when large generators have to be used.

U.S. Pat. No. 6,483,218 also describes a dynamoelectrical machine having a rotating transformer such as this. In this case, the transformer likewise comprises two concentric windings which are wound around the rotor axis, with the primary winding being arranged radially outside the secondary winding, and partially surrounding it. However, this arrangement also greatly restricts the possible forms of the dynamoelectrical machine. Furthermore, a very specific sequence must be complied with during assembly.

U.S. Pat. No. 3,758,845 describes a rotating transformer for an electrical machine, in which a flat, rectangular secondary winding is fitted on an outer surface of the rotor, and is radially opposite a corresponding primary winding. Although this transformer allows simple assembly and allows flexible forms for a dynamoelectrical machine equipped with it, the design means, however, that it is suitable only for the transmission of small signals. Furthermore, the power which can be transmitted is highly dependent on the instantaneous rotor position.

SUMMARY OF THE INVENTION

In an embodiment, the present invention provides an apparatus for transmission of electrical power including an AC voltage source configured to produce AC voltage. A stator includes a primary winding arrangement electrically fed from the AC voltage source, the primary winding arrangement having at least two primary windings. A rotor includes a secondary winding arrangement inductively coupled to the primary winding arrangement of the stator, the rotor being rotatable in a rotation direction about a rotation axis. The rotation axis does not pass through the at least two primary windings, and the at least two primary windings each extend over a predetermined sector with respect to the rotation direction and are disposed offset with respect to one another in the rotation direction.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment of the present invention, an apparatus is provided for transmission of electrical power from a stator to a rotor which can rotate, which apparatus can be designed in a space-saving manner, is simple to assemble, and allows greater power levels to be transmitted with less dependency on the rotation angle.

In an embodiment, an apparatus is provided for transmission of electrical power from a stator to a rotor, which apparatus has:
- an AC voltage source for production of an AC voltage;
- a stator having a primary winding arrangement which is electrically fed from the AC voltage source; and
- a rotor having a secondary winding arrangement with one or more secondary windings, which is inductively coupled to the primary winding arrangement, with the rotor being arranged such that it can rotate about a rotating axis and defining a rotation direction.

In an embodiment, this apparatus is distinguished in that the primary winding arrangement has at least two, preferably three or more, primary windings through which the rotation axis of the rotor does not pass, with each of the primary windings extending over a predetermined sector (angle range) with respect to the rotation direction of the rotor, and with the primary windings being arranged offset with respect to one another, with respect to the rotation direction.

The term at least two primary windings is also intended to cover an embodiment of a coil which consists of two halves, which are connected to one another during assembly and then form a winding.

In an embodiment, each primary winding preferably extends over a sector of at most 180°, and the primary windings are arranged such that they do not overlap, and in particular are arranged one behind the other with respect to the rotation direction.

In an embodiment, since at least two separate primary windings are formed through which the rotor axis does not pass, it is possible on the one hand to fit the primary windings separately from one another, and thus to provide the transformer at locations at which it would be impossible to fit a transformer with coaxial windings. In particular, the transformer does not need to be arranged at one end of the rotor, as is the case with solutions from the prior art. Furthermore, the space required is considerably less than that for an auxiliary generator, as a result of which the rotor does not need to be unnecessarily lengthened. A particular contribution is also made hereto in that a transformer can be operated at relatively high frequencies, thus allowing a high power density. On the other hand, uniform transmission of even relatively high power levels is ensured because there is not just a single primary winding, but there are a plurality of such primary windings arranged distributed over the circumference.

In the present context, a winding means any desired conductor arrangement in the form of a loop, which is suitable for passing a current through and for producing a magnetic field in the process, and which is suitable for allowing a magnetic flux to pass through and for outputting an induced voltage as a result of changes in this flux. In this case, a winding can traditionally be in the form of a wire coil with one or more turns. However, for example, it may also consist of a single conductor loop and/or of metal rods, strips or hollow conductors, through which water or gas can flow for cooling purposes.

Each of the primary windings is preferably arranged on a separate magnetic core. This minimizes leakage losses and achieves better efficiency. Since each primary winding is associated with a separate core, each primary winding can be fitted separately, together with its core, in a simple manner. In this case, the core may have various forms, depending on the specific requirements. In particular, the core may have a cross section with an E-shaped profile, a U-shaped profile or, in the simplest case, an I-shaped profile.

In order to simplify manufacture, the magnetic core may comprise a plurality of separately manufactured core segments, with each of these core segments extending only over a part of the sector (a partial angle range) of the associated primary winding. This is possible because, in the embodiment of the transformer proposed here, there is no significant magnetic flux in the circumferential direction (rotation direction), and the unavoidable gaps between the core segments therefore have no significant effects on the magnetic characteristics of the core.

In an embodiment, all the primary windings preferably have the same dimensions, and are preferably also designed to be identical. In order to ensure uniform power transmission, at least three primary windings are preferably provided, and the primary windings are distributed uniformly with respect to the rotation direction.

In an embodiment, the primary and secondary winding arrangements are preferably radially opposite one another, that is to say the areas enclosed or defined by the windings have an area normal which extends essentially in the radial direction. Alternatively, in other words, the primary and secondary windings are preferably each located essentially on a circular cylinder surface. Once again expressed in other words, the magnetic field which passes through the windings preferably covers the gap between the primary circuit and the secondary circuit essentially in the radial direction, that is to say the inductive coupling between the primary and secondary winding arrangements is essentially radial. However, it is also feasible for the primary and secondary winding arrangements to be axially opposite each other, at a distance from the rotation axis.

Each primary winding preferably has two sections which run essentially parallel, extend essentially in the circumferential direction (rotation direction) and through which current flows in opposite senses in operation, with the length of these sections being considerably greater than their separation, that is to say the winding has a curved shape, which is elongated along the rotation direction or the circumferential direction. This results in a transformer of particularly slimline design. However, other winding forms are also possible.

In order to save space, the primary winding arrangement is preferably arranged in an area which radially surrounds the secondary winding arrangement, and the primary and secondary winding arrangements are preferably arranged on the circumference of the rotor.

The efficiency of the proposed transformer can be considerably improved by operation at resonance. For this purpose, each of the primary windings preferably forms a part of a resonant circuit, and the AC voltage source is designed such that, during operation, it produces an AC voltage at an operating frequency in the region of a resonance of the resonant circuit. One example of a transformer operated at resonance is cited, for example, in the following document: R. Mecke and C. Rathge, High frequency resonant inverter for contactless energy transmission over large air gap, IEEE 35th Annual Power Electronics Specialists Conference (PESC), 2004, Volume 3, pp. 1737-1743. In this case, each primary winding may be part of a separate resonant circuit, or a plurality or all of the primary windings can be interconnected to form a single resonant circuit.

In an embodiment, the operating frequency of the transformer is preferably in the medium- to high-frequency range, in particular in the range above about 400 Hz. The AC voltage source is accordingly designed to produce an AC voltage at an operating frequency such as this and may, for example, be formed by an appropriately operated inverter or frequency converter. Suitable AC voltage sources are described in the prior art. The operating frequency is preferably about 1 kHz to 20 kHz, although it may also exceed this range and, for example, may reach 50 kHz or more. The choice of the operating frequency depends, inter alia, on the loss characteristics of the magnetic cores which are used.

In one preferred refinement, not only are there a plurality of primary windings, but the secondary arrangement also has at least two secondary windings, with each secondary winding extending over a predetermined sector with respect to the rotation direction of the rotor, and with the secondary windings being arranged offset with respect to one another, with respect to the rotation direction. In particular, this makes it possible to design the rotor to allow possible unbalances to be compensated for. In particular, the plurality of secondary windings with the same dimensions, and preferably also of the same design, can be arranged distributed uniformly in the circumferential or rotation direction.

A particularly elegant and simple design is achieved by arranging the secondary windings on a common magnetic core, which surrounds the rotor on its radial outside (on its circumference). This core may comprise at least one laminate which is wound around the rotor in the circumferential direction.

An embodiment of the invention also provides a dynamoelectrical machine, in particular an electrical generator in the form of a synchronous machine, whose field winding is fed by an apparatus for power transmission, as has been indicated above. For this purpose, the dynamoelectrical machine comprises at least one field winding, which is connected to the rotor, for production of a magnetic field which rotates with the rotor, and comprises at least one rectifier device which is connected to the rotor. The secondary winding arrangement is electrically connected to the rectifier device, in order to rectify the secondary voltage which is induced in the secondary winding arrangement, and the rectifier device is electrically connected to the field winding, in order to feed the field winding with the rectified secondary voltage.

In addition, the dynamoelectrical machine may have a fan which is connected to the rotor. In order to save space, the secondary winding arrangement can then be arranged in an area of the rotor which is located between the field winding and the fan with respect to the axial direction.

The proposed exciter current supply allows a high level of flexibility for feeding the exciter. In particular, it is therefore possible for the dynamoelectrical machine to have two or more field windings, which are fed separately from different secondary windings.

Figure 1:
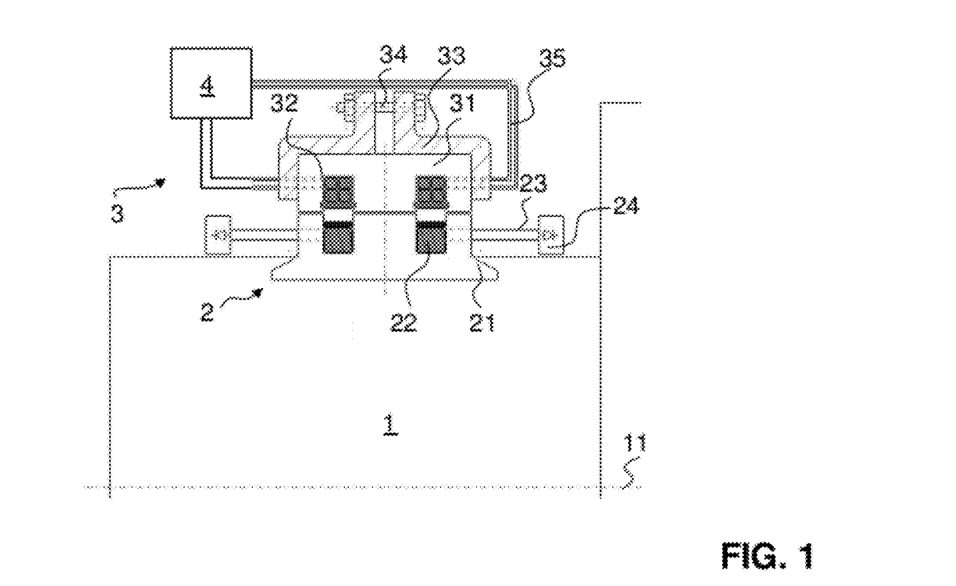
FIG. 1 shows a schematic longitudinal section through a rotating transformer according to a first embodiment of the invention.

A first embodiment of the present invention is illustrated schematically in FIG. 1. A rotor 1, which is indicated schematically in FIG. 1, is mounted such that it can rotate about a rotation axis 11. A rotatable transformer having a primary 3 and a secondary 2 is located along its circumference. The secondary 2 is attached to the circumference of the rotor 1 and rotates with it, while the position of the primary 3 is fixed. The primary 3 is fed with a primary voltage in the medium-frequency range (about 2 kHz to 50 kHz) from an AC voltage source 4 in the form of an inverter or converter.

The secondary 2 comprises a magnetic core 21, which is formed in a manner from iron laminates, in order to minimize eddy-current losses. The magnetic core 21 has a cross section with an E-shaped profile, which defines two parallel slots, which extend in the circumferential direction (rotation direction) and are open radially on the outside. Secondary windings 22 are inserted into these slots. A plurality of identical secondary windings 22 are arranged distributed one behind the other over the circumference of the rotor, with each of these secondary windings 22 extending over only a specific sector (angle range) of the circumference. For this purpose, the core 21 is interrupted a plurality of times with respect to the rotation direction, at least to such an extent that the secondary windings 22 can be closed in the area of these interruptions. Instead of a core 21 with a plurality of interruptions, it is also possible to provide a plurality of separate cores 21, with each secondary winding 22 being associated with its own core 21. Each of the secondary windings 22 encloses a curved area whose area normal faces radially outward everywhere. In order to achieve good balancing of the rotor 1, at least three secondary windings 22 are preferably distributed uniformly over the circumference.

The secondary windings 22 are connected via lines 23, which are indicated schematically, to a rectifier device 24, which is likewise indicated schematically, which rectifies the secondary voltage which is induced in the secondary windings 22. The output of the rectifier device 24 is connected to a field winding arrangement, which is likewise arranged on the rotor 1, and feeds the field windings with the rectified secondary voltage.

Figure 2:
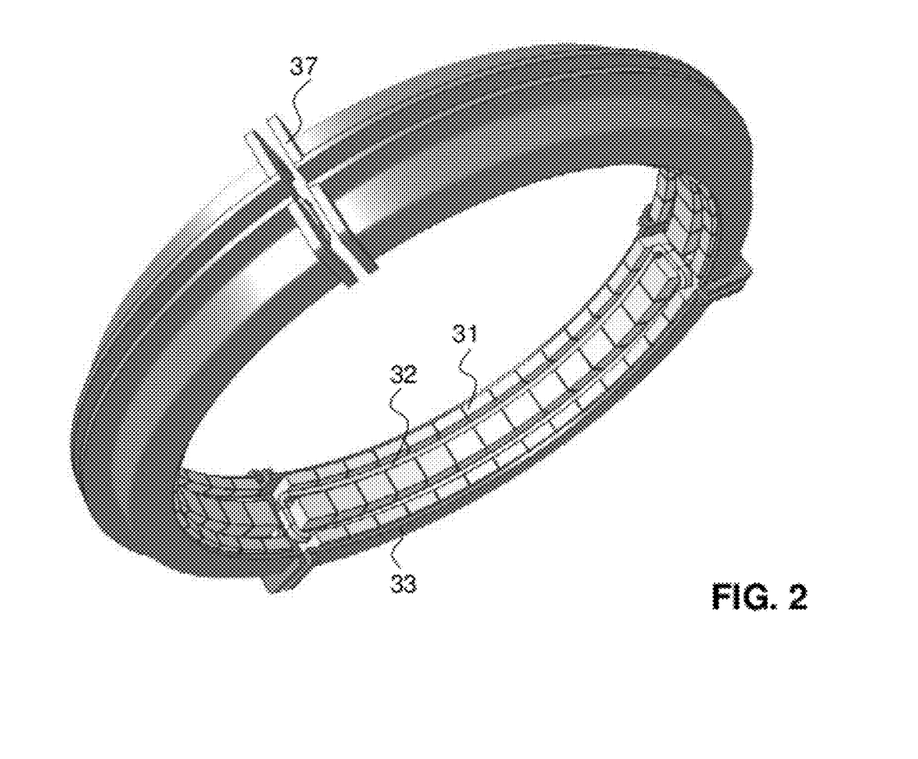
FIG. 2 shows a schematic perspective view of the primary winding arrangement of the rotating transformer shown in FIG. 1.
Figure 3:
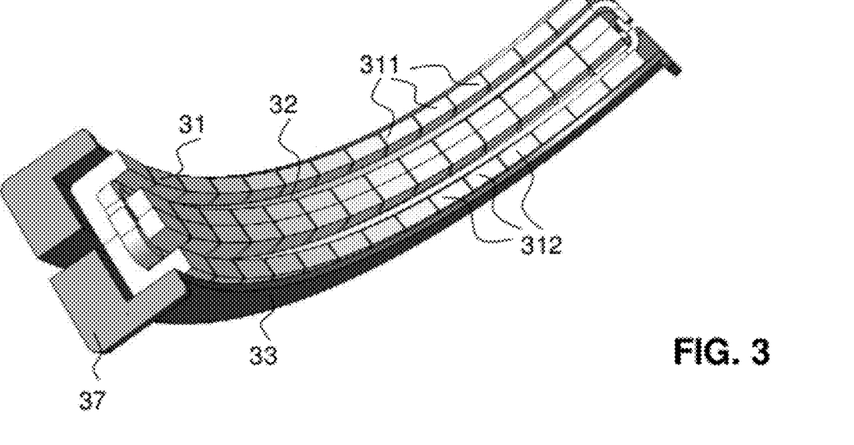
FIG. 3 shows a schematic perspective view of a single segment of the primary winding arrangement.
Figure 4:
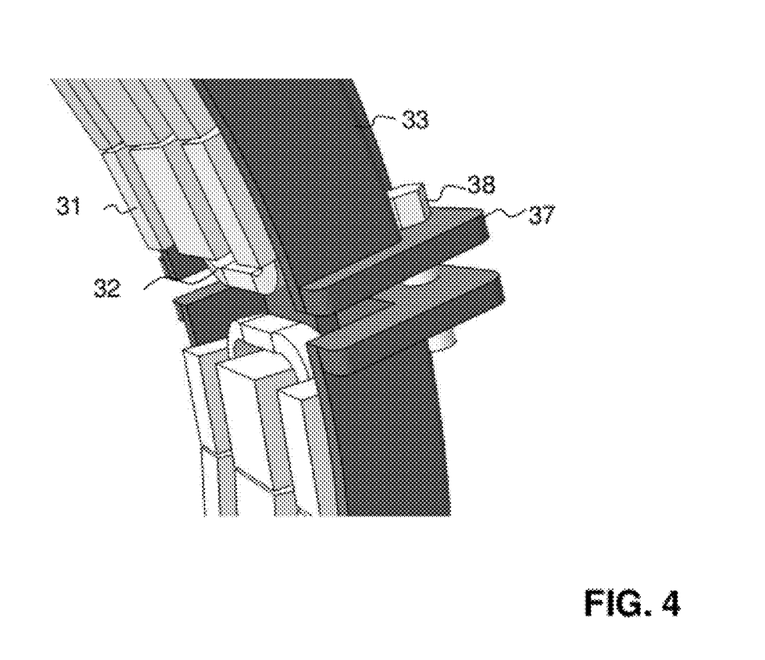
FIG. 4 shows an illustration of the connection between two successive segments.

FIGS. 2 to 4 illustrate one possible embodiment for the primary in more detail. The primary is formed from three identical segments, which are distributed uniformly over the circumference of the rotor and are arranged radially outside the secondary windings, in an area which surrounds the secondary windings. Each of these segments comprises a magnetic core 31, which has a profile with an E-shaped cross section, and therefore defines two parallel slots, which extend along the circumferential direction and are open radially inward. A primary winding 32 is inserted into the two slots in each segment.

In the present example, each primary winding 32 consists of four turns (cf. FIG. 1), but may, of course, also have more or less turns, and in the extreme may have only a single turn. It has an elongated basic shape, essentially with a curved rectangular shape, with the long sides of the rectangle running along the circumferential direction and being inserted into the slots in the core 31, while the short sides connect these two long sides in the axial direction, and run outside the core 31. Overall, this therefore results in each segment having a very slimline form in the axial direction. The curved area enclosed by the primary winding 32 has an area normal which faces in the radial direction everywhere, that is to say the primary windings are radially opposite the secondary windings, the pole surfaces of the cores of the primary and secondary face in the radial direction, and the magnetic flux between the primary and secondary crosses the gap between these pole surfaces essentially in the radial direction.

Once again, the magnetic core 31 itself consists of a multiplicity of core segments 311, 312. Each of these core segments 311, 312 has a U-shaped cross section and is formed in the normal manner from laminates, in order to minimize eddy-current losses. Two core segments 311, 312 are in each case arranged alongside one another in the axial direction, such that a pair of segments such as this forms an E-shaped cross section, overall. A plurality of these E-shaped pairs are arranged one behind the other in the circumferential direction, in order to form the entire magnetic core of the primary, in this way.

If commercially available standard parts are used in this case, then, as can be seen in particular in FIG. 4, gaps can occur between adjacent core segment pairs 311, 312 in the circumferential direction, because of the curvature. However, these are not critical to the operation of the transformer, since the magnetic lines of a force essentially follow the U-shape of each individual core segment and, in consequence, no significant magnetic field acts in the circumferential direction. The magnetic flux therefore does not need to cross the gaps between successive core segments, in practice, as a result of which these gaps have no significant influence on the operation. However, an arrangement of the core segments 311, 312 without gaps is preferable, and this is achieved by shaping the core segments 311, 312 to match the curvature of the stator.

The core 31 with the primary winding 32 inserted in it is fixed by a holder 33, which acts as a housing. The holder 33 comprises two halves which are in the form of shell elements and are arranged axially alongside one another. The two halves are held together axially by screws 34, which are illustrated only in FIG. 1, for the sake of clarity, and exert a clamping force on the core 31 in the axial direction. At each of its ends, the holder has connection flanges 37, the normal to whose area extends in the circumferential direction, with the connection flanges 37 of adjacent holders being opposite each other along the circumferential direction, and being connected to one another by screws 38, which are illustrated only in FIG. 4.

Figure 5:
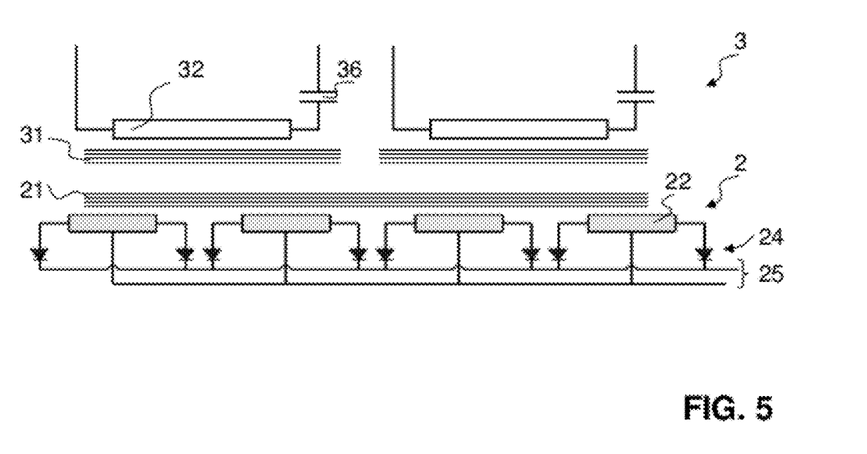
FIG. 5 shows an electrical schematic diagram for a rotating transformer having two primary windings and four secondary windings.

FIG. 5 shows a schematic electrical schematic diagram for a transformer according to the invention. In the example in FIG. 5, the primary 3 has only two primary windings 32. In this example, the secondary 2 has four secondary windings 22, which are each provided with three connections. The secondary windings 22 are inductively coupled to the primary windings 32 via a common magnetic core 21 on the secondary and cores 31 on the primary. The center connections of the secondary windings 22 are connected to one another, and form a first pole of a DC voltage intermediate circuit 25. The two other connections of the secondary windings 22 are connected to the second pole of the intermediate circuit 25 via diodes, which together form a rectifier arrangement 24. The field winding, which is not illustrated here, is fed from this intermediate circuit 25.

In order to achieve higher efficiency and to minimize losses, the system is preferably operated at resonance. For this purpose, each of the two primary windings 32 has a capacitance 36 added to it to form a resonant circuit, whose resonant frequency is defined by the inductance of the primary winding 32 and the capacitance 36. The operating frequency of the AC voltage source, which is not illustrated in FIG. 5 but which supplies the primary circuit that has been completed in this way, is tuned to this resonant frequency, that is to say the AC voltage source operates the primary circuit at or close to the resonant frequency. While FIG. 5 illustrates a series resonant circuit, the resonant circuit may also be a parallel resonant circuit or, particularly preferably, a combination of capacitances connected in series and parallel.

Figure 6:
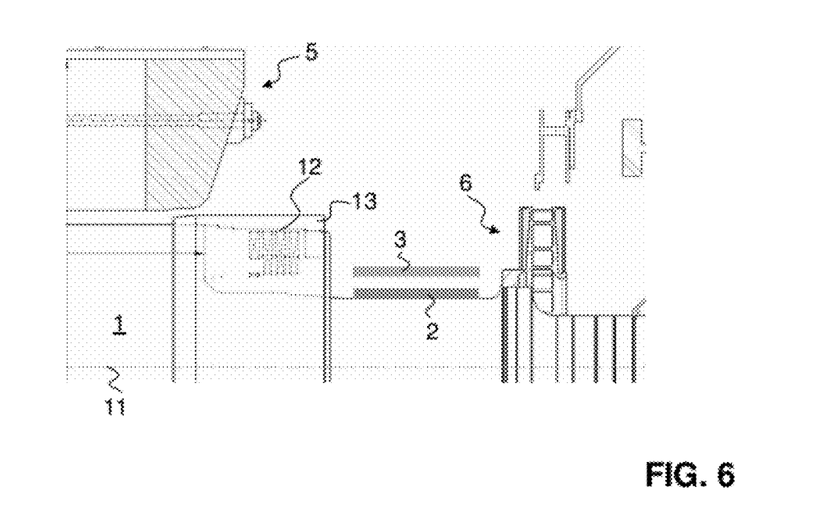
FIG. 6 shows a schematic illustration of the arrangement of a rotating transformer between a rotor cap and a fan.

FIG. 6 illustrates how a transformer of the type proposed here can be arranged in a space-saving manner between a so-called rotor cap 13 and the fan 6 of an electrical generator. The rotor 1, which is illustrated only partially and schematically here, is fitted with a field winding 12, which is only indicated in FIG. 6, in order to produce a magnetic field which rotates with the rotor 1. This produces an induced voltage in induction coils, which are not illustrated but are connected to a stator 5. The area of the rotor 1 in which the field winding ends is covered by the rotor cap 13. A fan 6 is connected along the rotor shaft, at a certain axial distance from the rotor cap 13. Sufficient space is available in this area in order to accommodate a rotating transformer of the type described above with a secondary 2 and a primary 3, both of which are only indicated here in a very highly schematic form.

Figure 7:
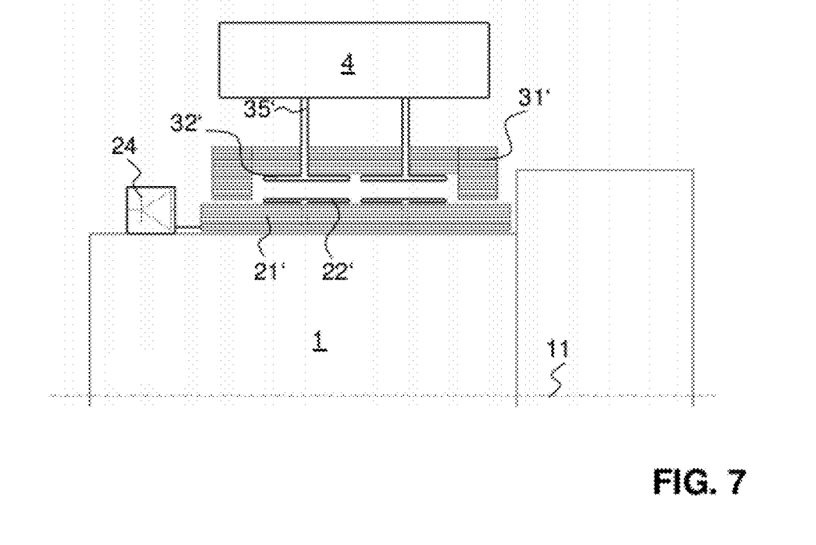
FIG. 7 shows a schematic longitudinal section through a rotating transformer according to a second embodiment of the present invention.

FIG. 7 schematically illustrates an alternative embodiment of a rotating transformer. In this case, the primary comprises a magnetic core 31' with a U-shaped cross section, while the magnetic core 21' of the secondary in this case has an I-shaped cross section. In the present case, the primary winding 32' consists of a single conductor loop, which is formed from a flat, hollow conductor. This is provided with connecting lines 35', which are likewise hollow but are indicated only schematically. This allows a cooling liquid, for example cooling water, to be pumped through the conductor. An AC voltage source 4 in the form of an inverter or converter supplies a primary voltage to the primary. The secondary windings 22' are also each formed by a single conductor loop formed by a flat, hollow conductor, through which a gas can flow for cooling. The secondary windings 22' are in turn connected to a rectifier 24, which is fixed in the rotor and is indicated only schematically here.

Figure 8:
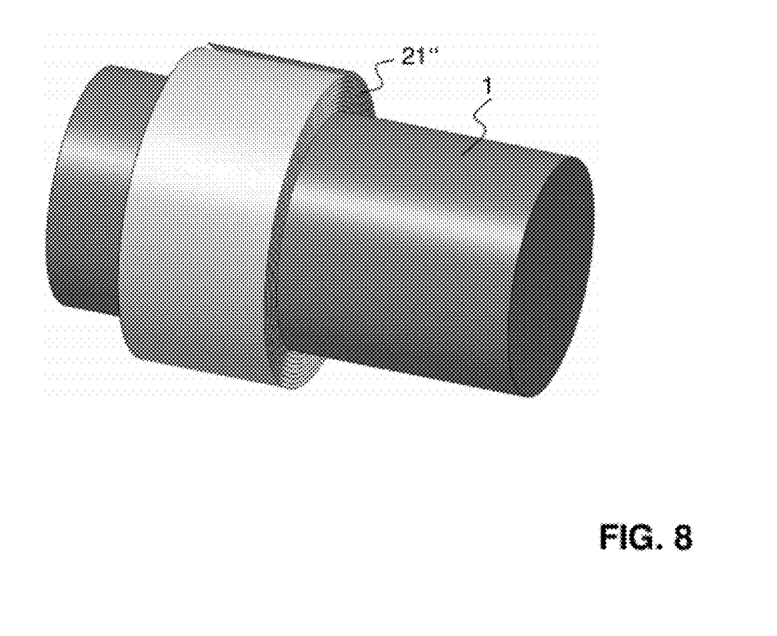
FIG. 8 shows an illustration of a core, which is wound onto a rotor, for the secondary winding arrangement of a rotating transformer according to a third embodiment.
Figure 9:
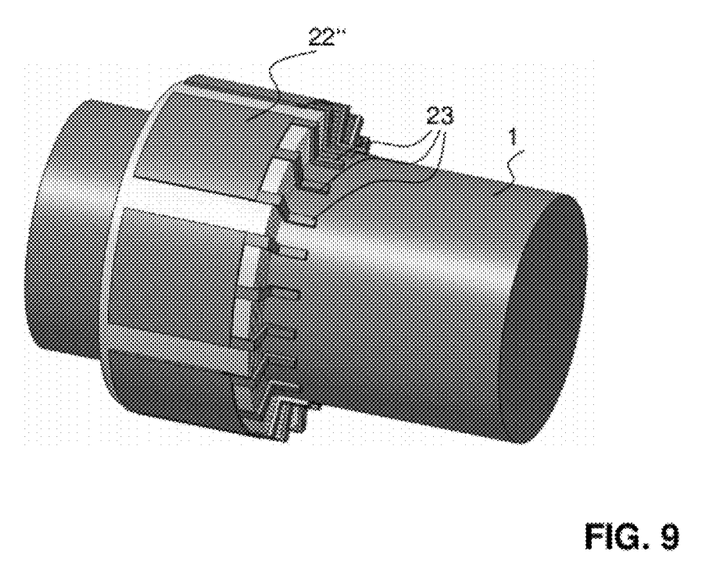
FIG. 9 shows a schematic illustration of the rotor with a core and with secondary windings arranged on it.
Figure 10:
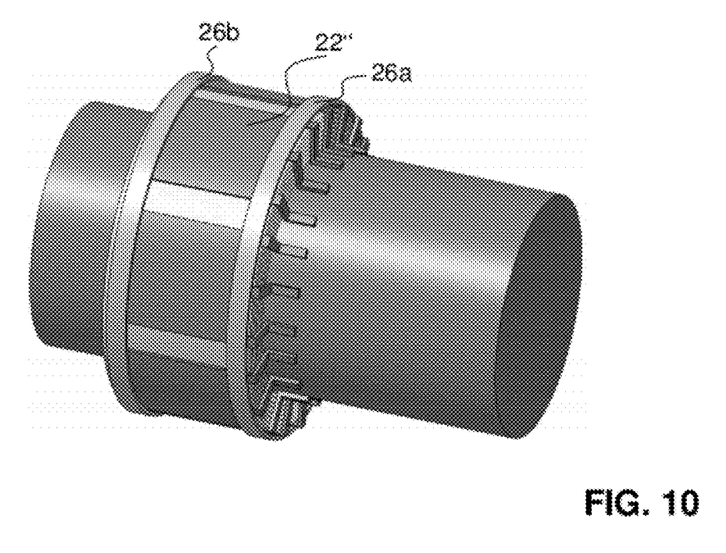
FIG. 10 shows a schematic illustration of the complete secondary winding arrangement with a core, secondary windings and end rings.

FIGS. 8 to 10 illustrate a variant of the design of the secondary, which is advantageous from the manufacturing point of view. A magnetic core 21" composed of a metal strip is wound onto a rotor 1, which is indicated only schematically here. Strips can be used for this purpose, in particular nanocrystalline core strips or Fe—Si strips, which are highly suitable for relatively low operating frequencies. A plurality of secondary windings 22" are fitted to the common core formed in this way, but these are indicated only highly schematically here. The connections 23 of these windings 22" are passed out in the axial direction and are bent radially inward toward the surface of the rotor. Finally, at its axial ends, the arrangement is provided with two circumferential end rings 26a, 26b, which are used to fix the secondary winding arrangement, and to further minimize leakage fields.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims. For example, one or more of the secondary windings can feed individual field windings separately; a plurality of independent rectifier arrangements can be provided for this purpose. In contrast to the exemplary embodiments above, the secondary windings can also be arranged such that they overlap and, in particular, can be formed by conductor bars which are parallel to the axis and are connected to collector rings, as described in EP 1 708 342. In particular, the present invention also makes it possible to provide a high-current supply for the field windings in a simple manner, allowing high currents in the region of 20 kA or more, in particular up to 100 kA.

| LIST OF REFERENCE SYMBOLS | |
|---|---|
| 1 | Rotor |
| 11 | Rotor axis |
| 12 | Field winding |
| 13 | Rotor cap |
| 2 | Secondary |
| 21, 21', 21" | Core |
| 22, 22', 22" | Secondary winding |
| 23 | Line |
| 24 | Rectifier device |
| 25 | Intermediate circuit |
| 26a, 26b | Fixing ring |
| 3 | Primary |
| 31, 31' | Core |
| 311, 312 | Core segment |
| 32, 32' | Primary winding |
| 33 | Holder |
| 34 | Screw |
| 35, 35' | Supply line |
| 36 | Capacitance |
| 37 | Attachment flange |

LIST OF REFERENCE SYMBOLS

| | |
|---|---|
| 38 | Screw |
| 5 | Stator |
| 6 | Fan |

What is claimed is:

1. An apparatus for transmission of electrical power comprising:
   an AC voltage source configured to produce AC voltage;
   a stator including a primary winding arrangement electrically fed from the AC voltage source, the primary winding arrangement having at least two primary windings; and
   a rotor including a secondary winding arrangement inductively coupled to the primary winding arrangement of the stator, the rotor being rotatable in a rotation direction about a rotation axis,
   wherein the rotation axis does not pass through the at least two primary windings and wherein the at least two primary windings each extend over a predetermined sector with respect to the rotation direction and are disposed offset with respect to one another in the rotation direction.

2. The apparatus as recited in claim 1, wherein the at least two primary windings each include a magnetic core and are disposed on their respective magnetic cores.

3. The apparatus as recited in claim 2, wherein each of the magnetic cores includes a plurality of core segments extending over a part of the section of the stator including the respective primary winding.

4. The apparatus as recited in claim 1, wherein the at least two primary windings have the same dimensions and are distributed uniformly with respect to the rotation direction.

5. The apparatus as recited in claim 1, wherein the at least two primary windings each enclose an area having an area normal facing a radial direction.

6. The apparatus as recited in claim 1, wherein the primary winding arrangement is disposed in an area radially surrounding the secondary winding arrangement.

7. The apparatus as recited in claim 1, wherein each of the at least two primary windings form a part of a resonant circuit, and wherein the AC voltage from the AC voltage source has an operating frequency in a region of a resonance of the resonant circuit.

8. The apparatus as recited in claim 1, wherein the AC voltage from the AC voltage source has an operating frequency of at 400 Hz or greater.

9. The apparatus as recited in claim 1, wherein the secondary winding arrangement includes at least two secondary windings each extending over a predetermined sector in the rotation direction of the rotor and disposed offset with respect to one another in the rotation direction.

10. The apparatus as recited in claim 9, wherein the at least two secondary windings have the same dimensions and are distributed uniformly with respect to the rotation direction.

11. The apparatus as recited in claim 9, wherein the at least two secondary windings are disposed on a common core surrounding the rotor.

12. The apparatus as recited in claim 11, wherein the common core includes at least one laminate wound around the rotor in a circumferential direction.

13. The apparatus as recited in claim 1, wherein the secondary winding arrangement is connected to a rectifier so as to rectify a secondary voltage induced in a secondary winding arrangement.

14. A dynamoelectrical machine having an apparatus for transmission of electrical power comprising:
   an AC voltage source configured to produce AC voltage;
   a stator including a primary winding arrangement electrically fed from the AC voltage source, the primary winding arrangement having at least two primary windings;
   a rotor including a secondary winding arrangement inductively coupled to the primary winding arrangement of the stator, the rotor being rotatable in a rotation direction about a rotation axis,
   wherein the rotation axis does not pass through the at least two primary windings and wherein the at least two primary windings each extend over a predetermined sector in the rotation direction and are disposed offset with respect to one another in the rotation direction;
   at least one field winding connected to the rotor configured to produce a magnetic field so as to rotate the rotor;
   a rectifier device connected to the rotor and electrically connected to the secondary winding arrangement and configured to rectify a secondary voltage induced in the secondary winding arrangement so as to form a rectified secondary voltage; and
   a field winding electrically connected to the rectifier device so as to feed the field winding with the rectified secondary voltage.

15. The dynamoelectrical machine as recited in claim 14, further comprising a fan connected to the rotor, wherein the secondary winding arrangement is disposed in an area of the rotor between the field winding and the fan with respect to a direction of the rotation axis.

* * * * *